US011374881B2

(12) United States Patent
Kim et al.

(10) Patent No.: US 11,374,881 B2
(45) Date of Patent: Jun. 28, 2022

(54) METHOD FOR PROCESSING NETWORK PACKETS AND ELECTRONIC DEVICE THEREFOR

(71) Applicant: Samsung Electronics Co., Ltd., Suwon-si (KR)

(72) Inventors: Youngwook Kim, Suwon-si (KR); Wonbo Lee, Suwon-si (KR); Youngki Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 16/833,009

(22) Filed: Mar. 27, 2020

(65) Prior Publication Data

US 2020/0314037 A1 Oct. 1, 2020

(30) Foreign Application Priority Data

Mar. 27, 2019 (KR) .................. 10-2019-0035418

(51) Int. Cl.
| | |
|---|---|
| *H04L 49/90* | (2022.01) |
| *H04L 47/193* | (2022.01) |
| *H04L 49/9005* | (2022.01) |
| *H04L 47/10* | (2022.01) |
| *H04L 49/9057* | (2022.01) |
| *H04L 47/30* | (2022.01) |

(52) U.S. Cl.
CPC ........ *H04L 49/9094* (2013.01); *H04L 47/193* (2013.01); *H04L 47/29* (2013.01); *H04L 47/30* (2013.01); *H04L 49/9005* (2013.01); *H04L 49/9057* (2013.01)

(58) Field of Classification Search
CPC ....... H04L 47/193; H04L 47/29; H04L 47/30; H04L 49/9005; H04L 49/9047; H04L 49/9057; H04L 49/9094
See application file for complete search history.

(56) References Cited

U.S. PATENT DOCUMENTS

| | | | |
|---|---|---|---|
| 7,836,195 B2 | 11/2010 | Veal et al. | |
| 8,018,961 B2 | 9/2011 | Gopinath et al. | |
| 8,996,718 B2 | 3/2015 | Biswas | |
| 9,112,819 B2 | 8/2015 | Gopinath et al. | |

(Continued)

OTHER PUBLICATIONS

International Search Report of the International Searching Authority in connection with International Application No. PCT/KR2020/004261 dated Jul. 24, 2020, 3 pages.

*Primary Examiner* — Omer S Mian
*Assistant Examiner* — Bao G Nguyen

(57) ABSTRACT

An electronic device including a wireless communication circuitry, a processor including a plurality of cores, and a memory. The processor receives a packet of a first session associated with a first core among the plurality of cores, identifies whether a core associated with the first session is changed to a second core different from the first core, sets pending information based on an amount of packets which are pending in a first packet of the first core when it is identified that the core is changed to the second core, stores data corresponding to the received packet of the first session in a pending buffer of the memory, and inserts the data corresponding to the received packet of the first session, stored in the pending buffer, into a packet queue of the second core.

18 Claims, 16 Drawing Sheets

(56) References Cited

U.S. PATENT DOCUMENTS

| | | |
|---|---|---|
| 9,384,033 B2 | 7/2016 | Jain et al. |
| 9,674,297 B2 | 6/2017 | Agarwal et al. |
| 9,742,682 B2 | 8/2017 | Jain et al. |
| 2009/0213732 A1* | 8/2009 | Veal ................... H04L 43/026 370/230 |
| 2010/0322265 A1 | 12/2010 | Gopinath et al. |
| 2012/0033680 A1 | 2/2012 | Gopinath et al. |
| 2013/0205037 A1 | 8/2013 | Biswas |
| 2014/0105087 A1* | 4/2014 | Gupta ..................... H04L 1/06 370/311 |
| 2015/0058682 A1* | 2/2015 | Nagumo ............ G06F 11/0724 714/47.3 |
| 2015/0261556 A1 | 9/2015 | Jain et al. |
| 2015/0263974 A1 | 9/2015 | Jain et al. |
| 2015/0341380 A1* | 11/2015 | Heo ................... H04L 63/1425 726/22 |
| 2016/0234127 A1 | 8/2016 | Agarwal et al. |
| 2019/0182708 A1* | 6/2019 | Yoshida ............. H04W 28/065 |
| 2020/0059459 A1* | 2/2020 | Abraham ............ H04L 12/4641 |

\* cited by examiner

METHOD FOR PROCESSING NETWORK PACKETS AND ELECTRONIC DEVICE THEREFOR

CROSS-REFERENCE TO RELATED APPLICATION

This application is based on and claims priority under 35 U.S.C. § 119 to Korean Patent Application No. 10-2019-0035418, filed on Mar. 27, 2019, in the Korean Intellectual Property Office, the disclosure of which is incorporated by reference herein its entirety.

BACKGROUND

1. Field

The disclosure relates to a method for processing network packets and an electronic device therefor.

2. Description of Related Art

An electronic device may process data using a processor to obtain information included in the data. For example, the electronic device may include a processor (e.g., a communication processor) for processing network packets. The electronic device may use a processor having multiple cores to improve a processing speed of a plurality of network packets. For example, by simultaneously using a plurality of cores to process network packets, the electronic device may improve a data processing speed.

To enhance data processing efficiency, the electronic device may use a packet merge function of processing packets of the same attributes into one packet. For example, the packet merge function may be referred to as offload or receive offload. The packet merge function may be a function defined in an operation system (OS) which is running in the electronic device, which may be performed in software. For example, the packet merge function may include generic receive offload (GRO) of LINUX. For another example, the packet merge function may be performed using hardware of the electronic device. For example, the packet merge function may be large receive offload (LRO) or receive segment coalescing (RSC) of WINDOWS.

The above information is presented as background information only to assist with an understanding of the present disclosure. No determination has been made, and no assertion is made, as to whether any of the above might be applicable as prior art with regard to the present disclosure.

SUMMARY

To enhance data processing efficiency, an electronic device may process received packets using a plurality of cores. The electronic device may allocate one of a plurality of sessions to another core while processing the plurality of session in one core and may process packets of the plurality of sessions using a plurality of cores. For example, the electronic device may process a session in another core using receive packet steering (RPS) or receive side steering (RSS). In this case, the core before the change may process packets of a first session before the change of the core, and the core after the change may process packets of the first session after the change of the core. When packets of the same session are processed by the plurality of cores, packets in the session may fail to be processed in sequence. For another example, the electronic device may off some cores as hotplug is on/off. In this case, packets which are not processed in the core which is offed may be processed by another core. As packets are processed to another core, packets in the same session may fail to be processed in sequence.

When the packets are not processed in sequence, they may cause an error on a network stack or a high layer thereof. The electronic device may request to retransmit packets, with respect to packets in which the error occurs. In this case, due to re-reception and re-processing of the packets, a processing speed, a throughput, and/or a round trip time of the session may be degraded.

Aspects of the disclosure are to address at least the above-mentioned problems and/or disadvantages and to provide at least the advantages described below.

In accordance with an aspect of the disclosure, an electronic device is provided. The electronic device may include a wireless communication circuitry, a processor operatively connected with the wireless communication circuitry and including a plurality of cores, and a memory operatively connected with the processor and mounted inside or outside the processor. The memory may store one or more instructions, when executed, causing the processor to receive a packet of a first session associated with a first core among the plurality of cores using the wireless communication circuitry, identify whether a core associated with the first session is changed to a second core different from the first core among the plurality of cores, set pending information based on an amount of packets which are pending in a first packet of the first core when it is identified that the core associated with the first session is changed to the second core and store data corresponding to the received packet of the first session in a pending buffer of the memory, and insert the data corresponding to the received packet of the first session, the received packet being stored in the pending buffer, into a packet queue of the second core, when the processing of the packets which are pending in the first packet queue is completed by the first core.

In accordance with another aspect of the disclosure, a method for processing data in an electronic device including a processor including a plurality of cores is provided. The method may include receiving a packet of a first session associated with a first core among the plurality of cores, identifying whether a core associated with the first session is changed to a second core different from the first core among the plurality of cores, setting pending information based on an amount of packets which are pending in a first packet of the first core, when it is identified that the core associated with the first session is changed to the second core and storing data corresponding to the received packet of the first session in a pending buffer of a memory of the electronic device, and inserting the data corresponding to the received packet of the first session, the received packet being stored in the pending buffer, into a packet queue of the second core, when the processing of the packets which are pending in the first packet queue is completed by the first core.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
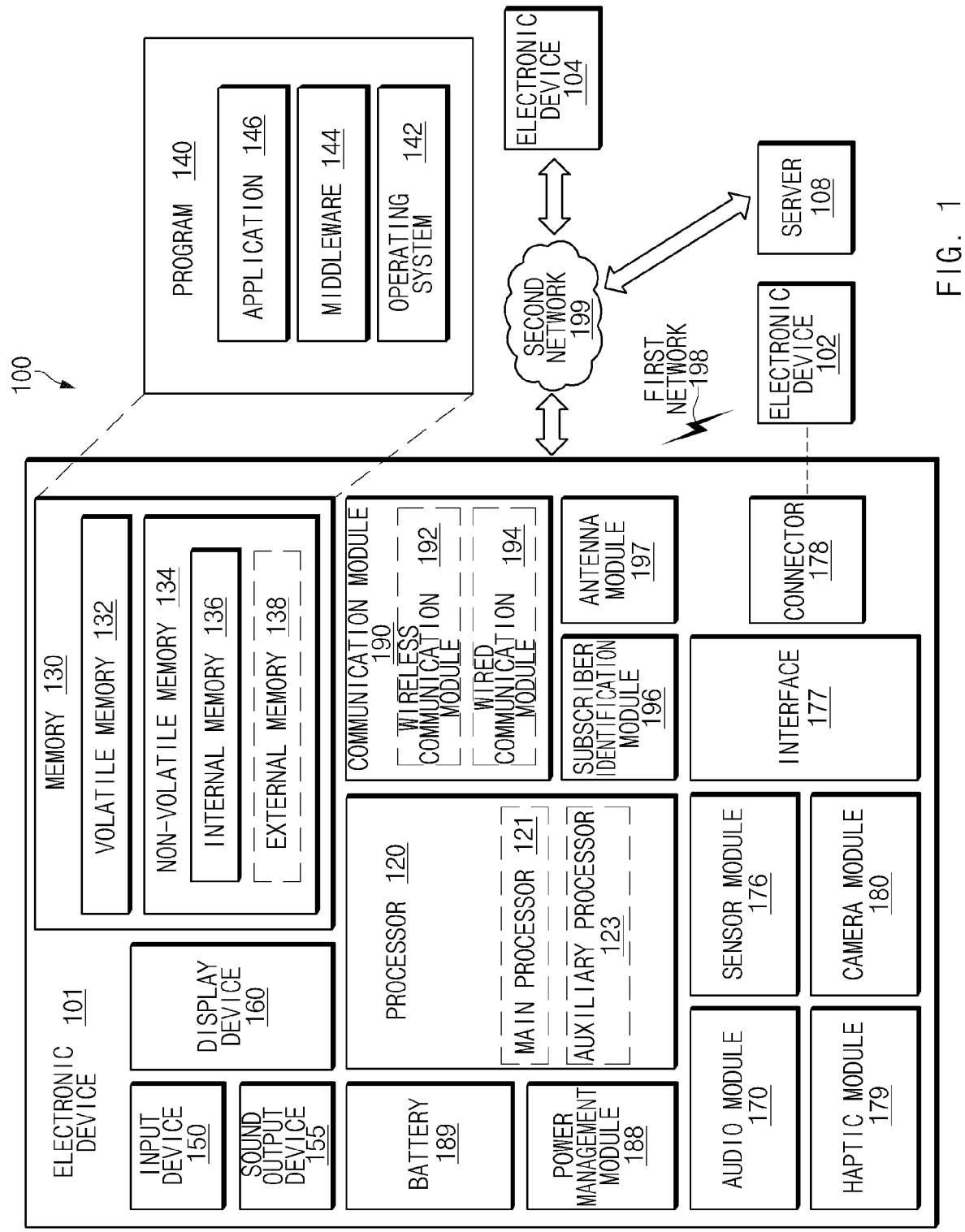
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
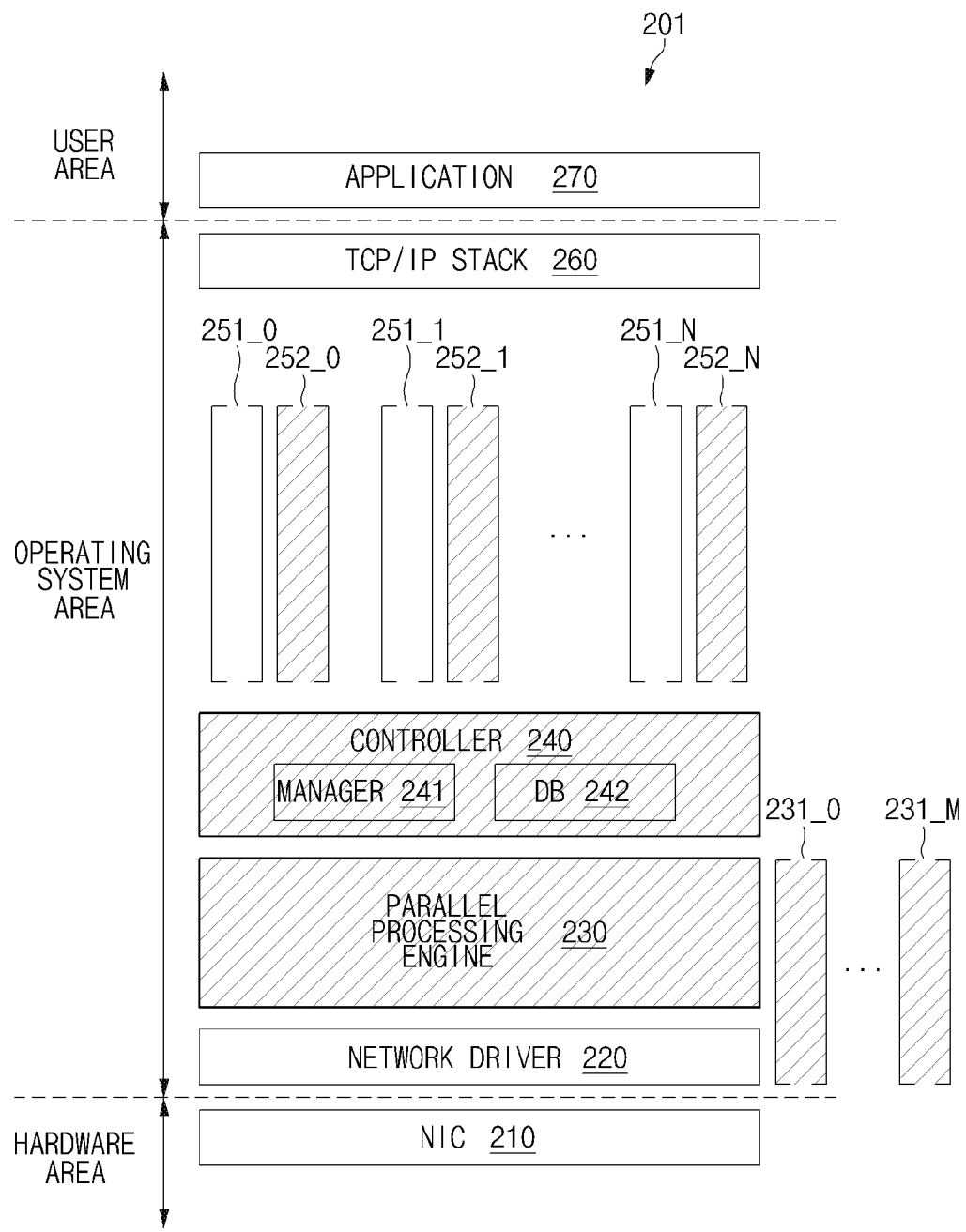
FIG. 2 illustrates a packet processing structure of an application processor (AP) according to an embodiment.

FIG. 2 illustrates a packet processing structure 201 of an application processor (AP) according to an embodiment.

According to an embodiment, various embodiments of the disclosure may be performed in an operating system area. For example, each of the operating system area and a user area may be an area processed by the AP (e.g., a processor 120 of FIG. 1). The hardware area may correspond to an interface between the AP and a communication processor (CP) (e.g., a communication module 190 of FIG. 1).

According to various embodiments, an AP of an electronic device (e.g., an electronic device 101 of FIG. 1) may include a plurality of cores (not shown). For example, the respective cores may have different characteristics (e.g., a clock, the amount of heating per unit processing, and/or the amount of current consumption per unit processing). For another example, the respective cores may have the same characteristic as each other. According to an embodiment, the AP may support a hotplug function. For example, the AP may dynamically activate or deactivate functions of some of the plurality of cores. In the disclosure, various embodiments are described about the AP for convenience of description, but embodiments of the disclosure are not limited thereto. For example, embodiments of the disclosure may be applied to various central processing units (CPUs), each of which includes the plurality of core.

According to various embodiments, a network interface card (NIC) 210 may provide an interface between the CP (e.g., the communication module 190 of FIG. 1) and the AP (e.g., the processor 120 of FIG. 1). For example, the NIC 210 may deliver packets, received from an external electronic device (e.g., a base station or another electronic device), to the AP.

According to various embodiments, a network driver 220 may convert data received from the NIC 210 into a form used in the AP (e.g., a form including a packet structure). For example, the packet structure may correspond to at least one of sk_buff, mbuf, or NET_BUFER_LIST.

According to various embodiments, a parallel processing engine 230 may allocate data received from the network driver 220 to at least one packet queue based on properties of packets. According to an embodiment, the parallel processing engine 230 may classify a session based on packet attributes of the received data. The parallel processing engine 230 may classify a session of the packet based on the attributes (e.g., a transmitter address (e.g., an internet protocol (IP) address), a receiver address (e.g., an IP address), a transmitter port, and/or a receiver port) of the received packet. The parallel processing engine 230 may allocate different session identifiers (IDs) to respective sessions.

According to an embodiment, the parallel processing engine 230 may allocate each session to one packet queue depending on a specified policy. For example, the specified policy may be based on any one of a round-robin, random, load-aware, user-defined, or pre-defined scheme. According to an embodiment, the parallel processing engine 230 may change a packet queue allocated to the session. For example, the parallel processing engine 230 may change the packet queue allocated to the session based on a load state of a core, deactivation of the core, or a specified policy.

According to various embodiments, a controller 240 may identify information of a packet received from the parallel processing engine 230 and may perform movement state determination of a session and pending determination of the session. For example, the controller 240 may include (or manage) a manager 241 and a database (DB) 242.

According to various embodiments, the manager 241 may determine a state of a corresponding session based on a session ID of the packet received from the parallel processing engine 230. For example, the manager 241 may identify the session ID of the packet and may determine a state of a session corresponding to the identified ID using the DB 242. According to an embodiment, the manager 241 may determine whether the session is in a state (e.g., a new session movement state) where movement of a packet queue is determined. For example, the manager 241 may compare a packet queue of a session, stored in the DB 242, with a packet queue determined by the parallel processing engine 230 to determine whether movement of the packet queue for the session is determined by the parallel processing engine 230. When the packet queue determined by the parallel processing engine 230 differs from the packet queue stored in the DB 242 for the session, the manager 241 may identify that the movement of the packet queue for the session is determined. According to an embodiment, the manager 241 may identify whether the session is in a pending state (e.g., a state where packet queue movement is in progress). For example, the manager 241 may identify a state of a session of the packet received from the parallel processing engine 230 from the DB 242 to identify whether the session is in a pending state.

According to an embodiment, the manager 241 may process the packet depending on the identified state of the session. For example, when the movement of the packet queue for the session is not identified, the manager 241 may insert the received packet into the packet queue determined by the parallel processing engine 230. For another example, when the session is identified as a new session movement state, the manager 241 may insert a packet into pending buffers 231_0 to 231_M (M is an integer of 1 or more), may update a state of the session to a pending state, and may insert a structure (e.g., pendingInfo) including session movement information into a pending information queue corresponding to a packet queue of the session before movement. For another example, when the session is identified as a pending state, the manager 241 may insert the packet into pending buffers 231_0 to 231_M.

According to various embodiments, the DB 242 may store information of the session monitored by the manager 241. According to an embodiment, the DB 242 may include an identifier of the session, movement packet queue information of the session, a pending state flag of the session, pending buffer information of the session, and/or session movement threshold information. For example, the identifier of the session may include a session ID (e.g., a number) allocated to the session by the parallel processing engine 230. For example, the packet queue information of the session (e.g., a queue number to move) may include information of a packet queue into which the session will be inserted. For example, the pending state flag (e.g., FLAG) of the session may indicate whether or not the session is currently in a pending state. For example, the pending buffer information of the session may indicate a location of a pending buffer (e.g., a temporary buffer) of the session which is in the pending state. For example, the session movement threshold information may include information about a time for ensuring that packets of one session are sequentially processed before and after movement of a packet queue.

According to an embodiment, the manager 241 may set a session movement threshold based at least in part on the number of packets inserted into a packet queue before movement. For example, when session A moves from packet queue B to packet queue C, the manager 241 may set a session movement threshold based on the number of total packets inserted into packet queue B until a time when pending information of session A is generated. For another example, when moving all sessions of packet queue B to packet queue C, the manager 241 may move all packets of packet queue B to packet queue C and may then set a session movement threshold based on the number of total packets inserted into packet queue C. According to an embodiment, respective cores may update the number of packets currently inserted into a related packet queue and the number of processed packets in the DB 242. For example, the manager 241 may identify the number of packets which are currently pending in a packet queue, using information stored in the DB 242.

According to an embodiment, a plurality of packet queues 251_0 to 251_N may correspond to the plurality of cores in the AP, respectively. For example, packet queue 0 251_1 may be a memory area corresponding to a first core among the plurality of cores. Each core may process packets inserted into a corresponding packet queue.

According to various embodiments, pending information queues (e.g., the pending information queues 252_0 to 252_N) may correspond to packet queues (e.g., the packet queues 251_0 to 251_N), respectively. For example, pending information queue 0 252-0 may corresponding to packet queue 0 251-0. The core may process data of a packet queue using pending information inserted into a corresponding pending information queue. For example, the pending information may include movement pending information of a session to move. For example, the pending information may include at least one of location information of information about the session on the DB 242, information of the session stored in the DB 242, and/or identification information of the session. According to an embodiment, each core may process packets of a pending buffer using pending information of a corresponding pending information queue. For example, each core may determine whether to process packets of a pending buffer using a session movement threshold of pending information.

According to an embodiment, pending buffers 231_0 to 231_M may temporarily store packets of a session which is pending. For example, the pending buffer may be a memory in the AP, or may be included in an external memory (e.g., a memory 130 of FIG. 1) connected to the AP. According to an embodiment, at least one of the plurality of cores of the AP may merge a plurality of packets stored in the pending buffer. For example, the at least one core may perform receive offload (e.g., generic receive offload (GRO)) of the plurality of packets stored in the pending buffer.

Table 1 below is an example of session information stored in the DB 242 according to an embodiment.

TABLE 1

| Session ID | Queue number to move | Threshold | FLAG | Temporary buffer location |
|---|---|---|---|---|
| 0 | 1 | — | 0 | — |
| 1 | 3 | 1234 | 1 | 1 |
|  |  | (Omitted) |  |  |
| Q | N | 1024 | 1 | M |

For example, each of Q, N, and M may be an integer of 1 or more. For example, the manager 241 may identify session information of the DB 242 and may perform the above-mentioned operations.

Referring to Table 1 above, for example, when a session ID of the packets received from the parallel processing engine 230 is 0 and when a queue number of the packet indicates 1, the manager 241 may insert the packet into packet queue 0 251-0. For another example, when a session ID of the packet received from the parallel processing engine 230 is 0 and when a queue number of the packet indicates 2, the manager 241 may identify that movement of a packet queue for the session is determined. In this case, the manager 241 may update a queue number to move to 2 and may update FLAG to 1. The manager 241 may determine a pending buffer for the session, may insert the packet into the determined buffer, and may update a temporary buffer location of the DB 242. The manager 241 may set a threshold based at least in part on the number of packets which are pending in packet queue 0 251-0 and may update the set threshold in the DB 242. Furthermore, the manager 241 may insert pending information into pending information queue 0 252-0 corresponding to packet queue 0 251-0.

Referring to Table 1 above, for another example, when a session ID of the packet received from the parallel processing engine 230 is 1 and when a queue number of the packet indicates 3, the manager 241 may identify a flag value and may store the packet in pending buffer 1 231-1.

According to an embodiment, each core may process packets of a packet queue and may deliver the processed packets to a transmission control protocol/internet protocol (TCP/IP) stack 260. The TCP/IP stack 260 may process the received packets. The TCP/IP stack 260 may process the packet to process the received packet in the user area and may then deliver data corresponding to the processed packet to the user area (e.g., an application 270). For example, the application 270 may perform a specified operation using the received data (e.g., an operation corresponding to the received data).

Figure 3:
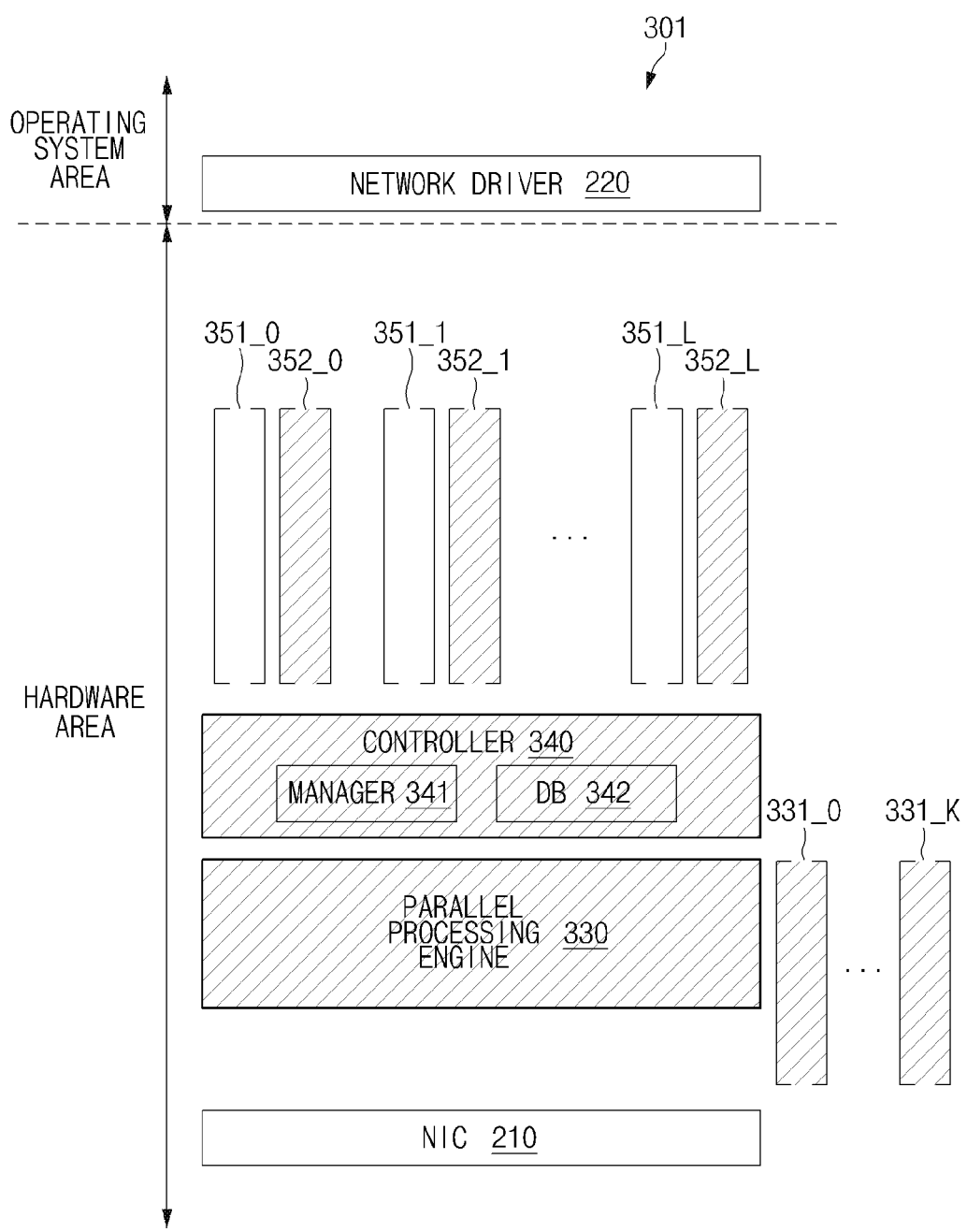
FIG. 3 illustrates a packet processing structure of a communication processor (CP) according to an embodiment.

FIG. 3 illustrates a packet processing structure of a CP according to an embodiment.

In conjunction with FIG. 2, the methods for processing the packets in the operating system area were described above. However, embodiments of the disclosure are not limited thereto. According to an embodiment, the methods for processing the above-mentioned packets may be performed in a hardware area. For example, an electronic device (e.g., an electronic device 101 of FIG. 1) may include separate hardware for processing packets. For example, the electronic device 101 may include a hardware configuration for processing the above-mentioned packets in a CP (e.g., a communication module 190 of FIG. 1).

According to various embodiments, a parallel processing engine 330 may allocate data received from a network driver 220 to at least one packet queue based on attributes of packets. A description of the parallel processing engine 330 may refer to the description of the parallel processing engine 230 of FIG. 2.

According to various embodiments, a controller 340 may identify information of the packet received from the parallel processing engine 330 and may perform movement state determination of a session and pending determination of the session. For example, the controller 340 may include a manager 341 and a DB 342. Descriptions of the controller 340, the manager 341, and the DB 342 may refer to the descriptions of the controller 240, the manager 241, and the DB 242 of FIG. 2, respectively. For example, packet queues 351_0 to 351_L and pending information queues 352_0 to 352_L (e.g., L is an integer of 1 or more) may correspond to packet queues 251_0 to 251_N and pending information queues 252_0 to 252_N. The pending buffers 331_0 to 331_K (e.g., K is an integer of 1 or more) may correspond to pending buffers 231_0 to 231_L of FIG. 2. The plurality of packet queues 351_0 to 351_L may correspond to a plurality of cores of the CP, respectively.

According to various embodiments, the pending buffers 331_0 to 331_K may temporarily store packets of a session which is pending. For example, the pending buffer may be a memory in the CP, or may be an external memory connected to the CP. According to an embodiment, at least one of the plurality of cores of the CP may merge a plurality of packets stored in the pending buffer. For example, the at least one core may perform receive offload (e.g., large receive offload (LRO)) of the plurality of packets stored in the pending buffer.

Hereinafter, various embodiments may be described about a packet processing structure 201 of FIG. 2. Various embodiments described below may be performed by a structure 301 of FIG. 3.

Figure 4:
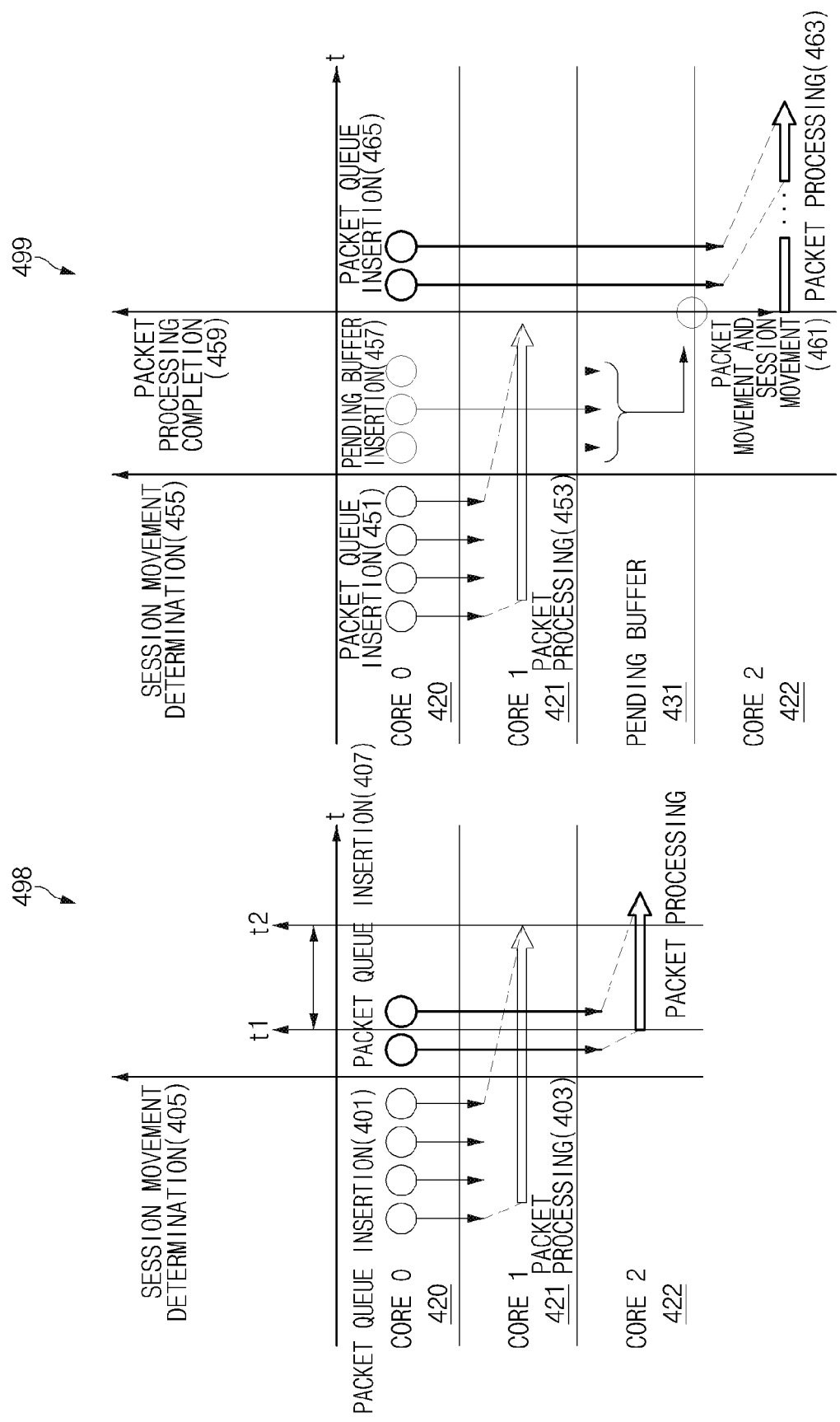
FIG. 4 illustrates examples of processing packets depending on a change in session.

FIG. 4 illustrates examples of processing packets depending on a change in session.

For example, a processor (e.g., an AP (e.g., a processor 120 of FIG. 1) or a CP (e.g., a communication module 190 of FIG. 1)) may include a plurality of cores (e.g., core 0 420, core 1 421, and core 3 422). The number of the cores of FIG. 4 is illustrative, and embodiments of the disclosure are not limited thereto. For example, in the example of FIG. 4, core 0 420 may operate as a control core which performs operations of a parallel processing engine (e.g., a parallel processing engine of FIG. 2) and a controller (e.g., a controller 240 of FIG. 2).

Referring to reference numeral 498, in operation 401, core 0 420 may insert packets of a first session into a packet queue of core 1 421. In operation 403, core 1 421 may process the inserted packets. In operation 405, before the processing of the packets of core 1 421 is completed, core 0 420 may determine session movement of the first session. According to the determination of the session movement, in operation 407, core 0 420 may insert the packets of the first session into a packet queue of core 2 422. For example, core 2 422 may start to process packets of first sessions from time t1. Core 1 421 may complete the processing of the packets of the first sessions at time t2. In this case, between from time t1 to time t2, core 1 421 and core 2 422 may simultaneously process the packets of the first sessions. Thus, the packets of the first sessions may fail to be processed in sequence.

According to an embodiment, referring to reference numeral 499, in operation 451, core 0 420 may insert the packets of the first session into a packet queue of core 1 421. In operation 463, core 1 421 may process the inserted packets. In operation 455, before the processing of the packets of core 1 421 is completed, core 0 420 may determine session movement of the first session. According to the determination of the session movement, in operation 457, core 0 420 may insert the packets of the first session into a pending buffer. In operation 459, the processing of the packets of the first session of core 1 421 may be completed. When the processing of the packets is completed, in operation 461, core 0 420 may move the packets inserted into the pending buffer and the first session to core 2 422. For example, when the processing of the packets of the first session is completed, core 1 421 may transmit a signal indicating that the processing is completed to core 0 420.

When the signal indicating that the processing is completed is received, core 0 420 may move packets of a pending buffer 431 to core 2 422. For another example, core 1 421 may obtain ownership of the pending buffer 431 (e.g., the right to synchronize the pending buffer 431) and may move the packets of the pending buffer 431 to core 2 422 when the processing of the packets of the first session is completed. For another example, when the processing of the packets of the first session is completed by core 1 421, core 2 422 may move the packets of the pending buffer 431.

In operation 463, core 2 422 may process packets inserted into a packet queue. In operation 465, core 0 420 may insert the packets of the first session into a packet queue of core 2 422. For example, core 2 422 may process the packets inserted into the packet queue from a time when the packet processing of core 1 421 is completed. Furthermore, core 0 420 may packets of the first session, which are received from inserting the packets of the pending buffer 431 into the packet queue of core 2 422, into the packet queue of core 2 422. Core 2 422 may process the packets of the first session sequentially after the processing of the packets of the first session is completed by core 1 421. Thus, core 1 421 and core 2 422 may sequentially process the packets of the first session. In this case, out-of-order processing of the first sessions (e.g., in case of reference numeral 498) may fail to occur.

Figure 5:
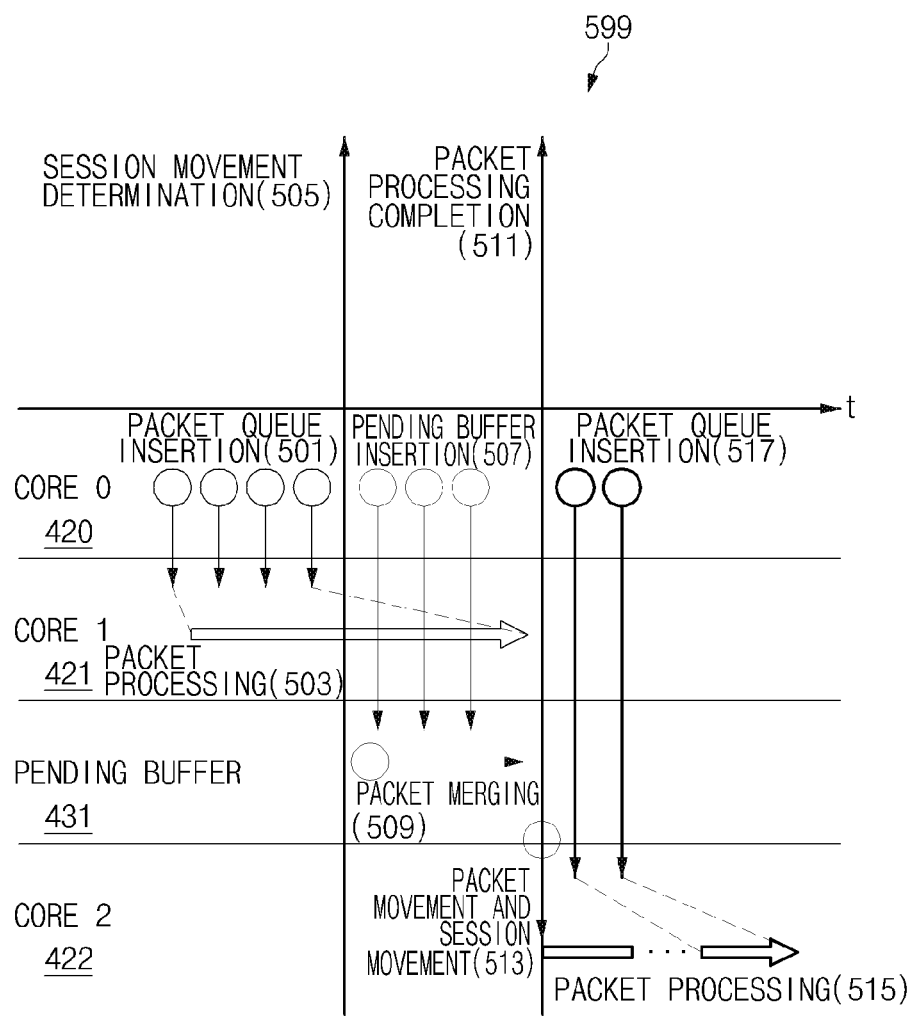
FIG. 5 illustrates a packet processing flow according to an embodiment.

FIG. 5 illustrates a packet processing flow according to an embodiment.

In FIG. 5, a description of components having the same reference numerals as those in FIG. 4 may refer to the description of FIG. 4.

Referring to reference numeral 599, according to an embodiment, in operation 501, core 0 420 may insert packets of a first session into a packet queue of core 1 421. In operation 503, core 1 421 may process the inserted packets. In operation 505, before the processing of the packets of core 1 421 is completed, core 0 420 may determine session movement of the first session. According to the determination of the session movement, in operation 507, core 0 420 may insert the packets of the first session into a pending buffer.

According to an embodiment, in operation 509, core 0 420 may merge packets in a pending buffer 431. For example, core 0 420 may merge the packets by performing receive offload (e.g., GRO or LRO). For another example, core 1 421 or core 2 422 may merge the packets by performing receive offload. In this case, core 0 420 may transmit a signal indicating the receive offload to core 1 421 or core 2 422. For another example, a specified core (e.g., core 0 420, core 1 421, and/or core 2 422) may perform the receive offload.

In operation 511, the processing of the packets of the first session by core 1 421 may be completed. When the packet processing is completed, in operation 513, core 0 420 may move the merged packet in the pending buffer 431 and the first session to core 2 422. In operation 513, it is described that core 0 420 moves the packet, but embodiments of the disclosure are not limited thereto. For example, as described above in conjunction with operation 461 of FIG. 4, core 1 421 or core 2 422 may move the packet. In operation 515, core 2 422 may process packets inserted into a packet queue. In operation 517, core 0 420 may insert the packets of the first session into a packet queue of core 2 422. For example, core 2 422 may process the packets inserted into the packet queue from a time when the packet processing of core 1 421 is completed. Furthermore, core 0 420 may insert packets of the first session, which are received after inserting the packets of the pending buffer 431 into the packet queue of core 2 422, into the packet queue of core 2 422. Core 2 422 may process the packets of the first session sequentially after the processing of the packets of the first session by core 1 421 is completed. Thus, core 1 421 and core 2 422 may sequentially process the packets of the first session. In this case, a problem caused by out-of-order processing of the first sessions (e.g., in case of reference numeral 498) may be solved. Furthermore, because core 2 422 processes the merged packet, a decrease in throughput due to movement of the packet queue of the first session may be quickly recovered.

In the embodiments of FIGS. 4 and 5, according to an embodiment, core 0 420 (e.g., a controller 240 of FIG. 2) may identify the packet processing completion (e.g., operation 459 of FIG. 4 or operation 511 of FIG. 5). For example, core 0 420 may identify the packet processing completion based on information about the number of inserted packets of core 1 421 and/or the number of processed packets, which are stored in a DB (e.g., a DB 242 of FIG. 2). For another example, core 1 421 may transmit a signal indicating the packet processing completion to core 0 421 when upon the completion of the packet processing. For another example, core 1 421 may transmit the signal indicating the packet processing completion to core 2 422 upon the completion of the packet processing.

Figure 6:
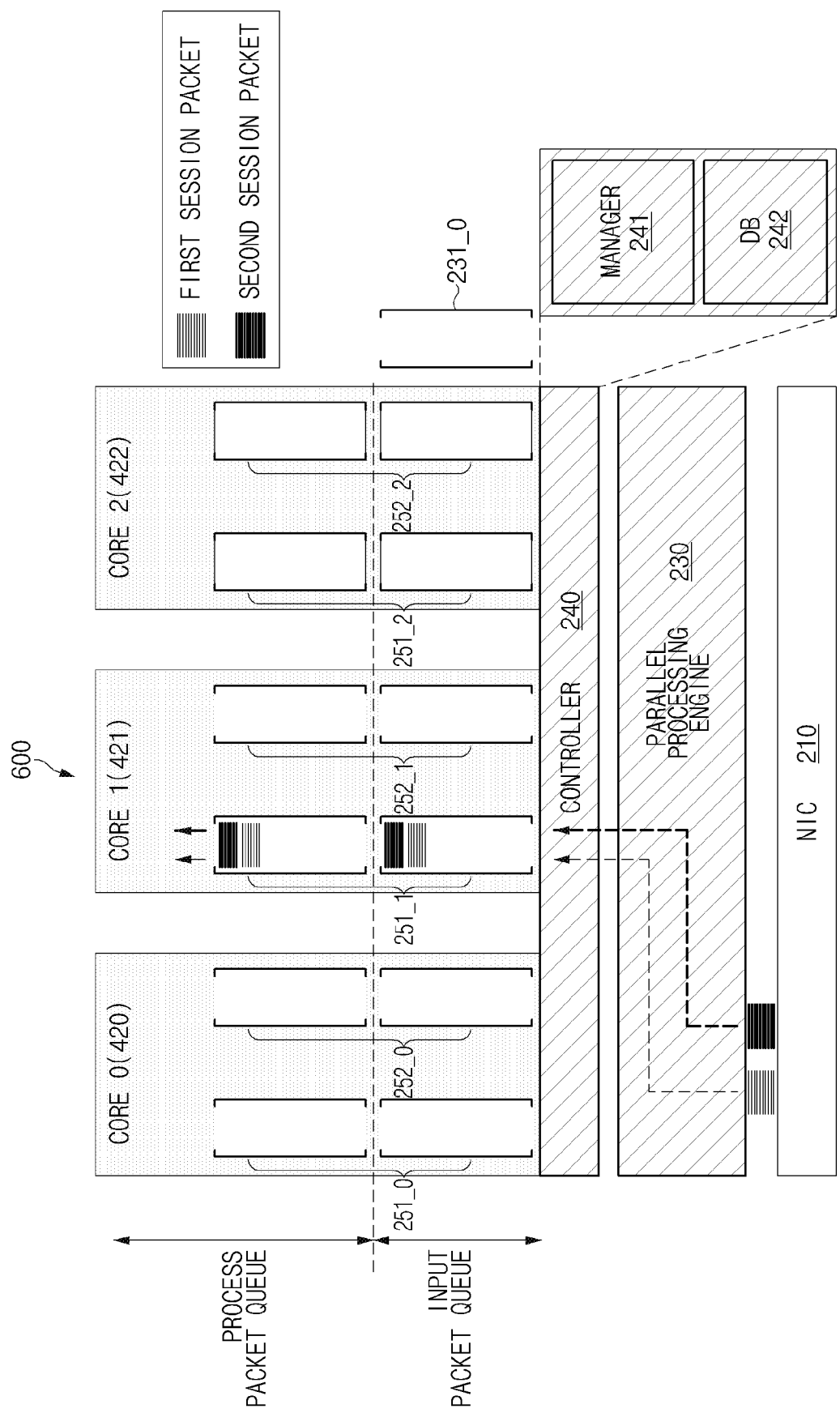
FIG. 6 illustrates a packet allocation state according to an embodiment.

FIG. 6 illustrates a packet allocation state 600 according to an embodiment.

For example, a processor (e.g., an AP (e.g., a processor 120 of FIG. 1) or a CP (e.g., a communication module 190 of FIG. 1)) may include a plurality of cores (e.g., core 0 420, core 1 421, and core 2 422). The number of the cores of FIG. 6 is illustrative, and embodiments of the disclosure are not limited thereto. For example, in the example of FIG. 6, core 0 420 may operate as a control core which performs operations of a parallel processing engine 230 (e.g., a parallel processing engine 230 of FIG. 2) and a controller 240 (e.g., a controller 240 of FIG. 2). In FIG. 6, one pending buffer 231_0 is shown, but a plurality of pending buffers may be present.

According to an embodiment, each of packet queues 251_0 to 251_2 and pending information queues 252_0 to 252_2 may include a process packet queue and an input packet queue. For example, the process packet queue may be a memory area in which packets currently processed by a corresponding core are stored. The input packet queue may be a memory area in which packets to be processed after the corresponding core currently processes packets of the process packet queue are stored. For example, the controller 240 may insert a packet and pending information into the input packet queue. A core may currently process packets of the process packet queue and may then process a packet of the input packet queue.

In the example of FIG. 6, the controller 240 may insert packets of a first session and packets of a second session into an input packet queue of packet queue 251_1 of core 1 421 depending on the determination of the parallel processing engine 230. Furthermore, core 1 421 may process the packets of the first session and the packets of the second session, which are inserted into a process packet queue of packet queue 1 251_1.

Figure 7:
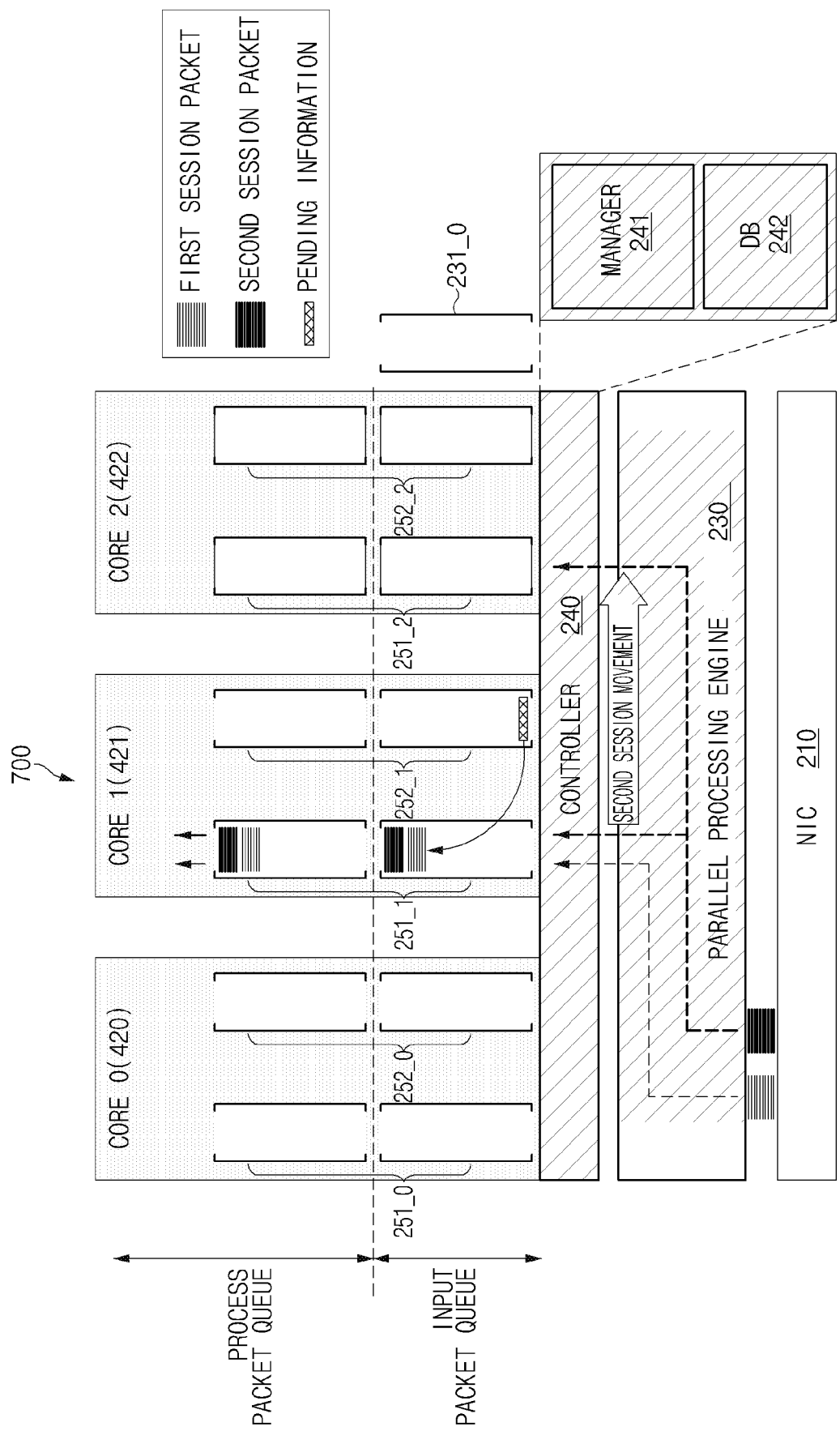
FIG. 7 illustrates settings of a packet queue according to session movement according to an embodiment.

FIG. 7 illustrates settings 700 of a packet queue according to session movement according to an embodiment.

For example, a parallel processing engine 230 may determine to move a packet queue allocated to a second session from packet queue 1 251_1 to packet queue 2 251_2. According to an embodiment, a controller 240 may identify that the packet queue allocated to the second session received from the parallel processing engine 230 is changed. For example, the controller 240 may compare the packet queue allocated to the second session by the parallel processing engine 230 with information of the second session in a DB 242 to identify a change of the packet queue.

According to an embodiment, when the change of the packet queue is identified, the controller 240 may insert pending information into an input packet queue of pending information queue 1 252_1. For example, the pending information may be to set the number of packets of the input packet queue as session movement threshold information. For example, the controller 240 may update the information of the second session in the DB 242. The controller 240 may update packet queue information, a movement state flag, a temporary buffer location, and/or session movement threshold information of the information of the second session in the DB 242.

Figure 8:
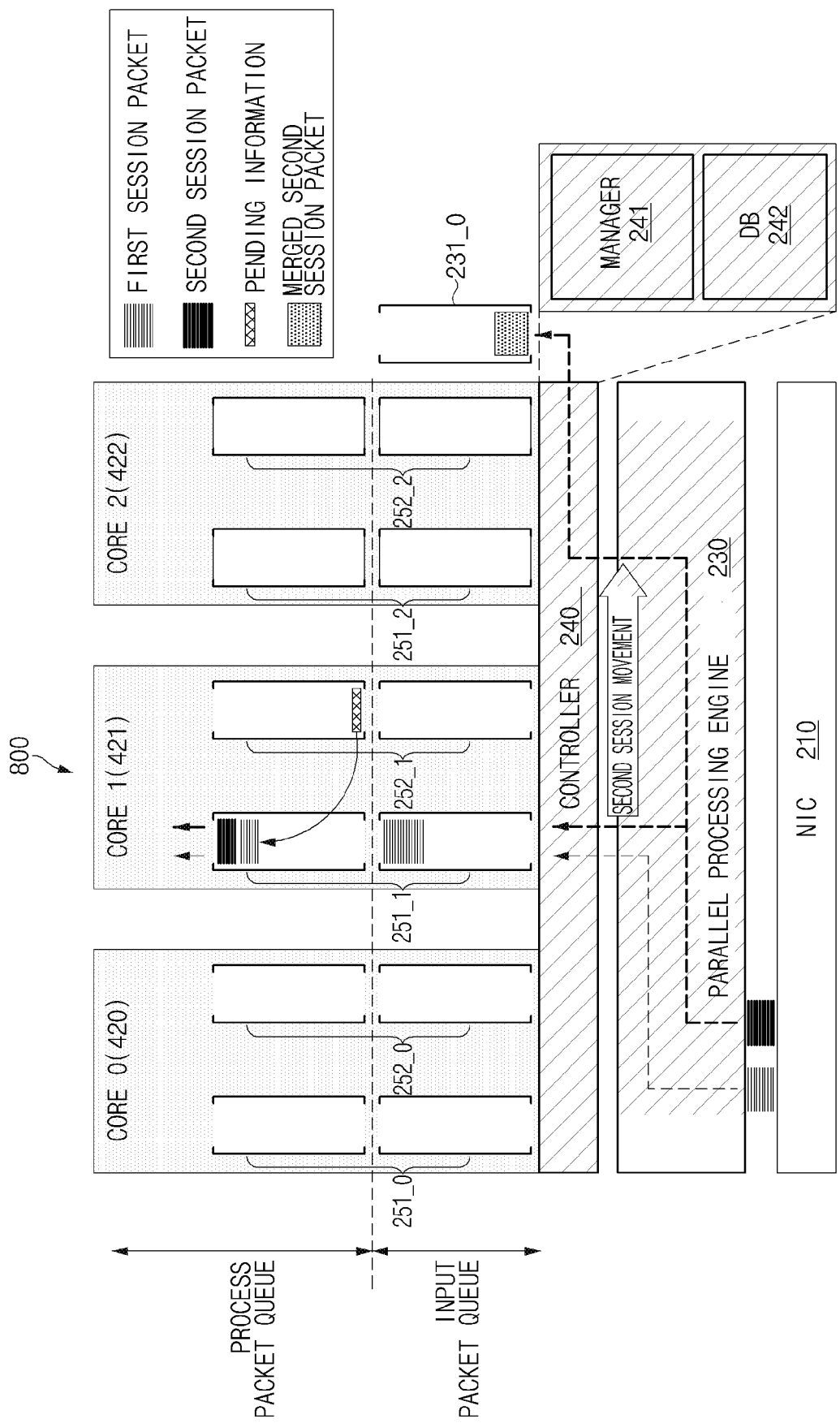
FIG. 8 illustrates packet buffering according to an embodiment.

FIG. 8 illustrates packet buffering 800 according to an embodiment.

For example, core 1 421 may process packets and pending information of packet queue 1 251_1 and pending information queue 1 252_1 of an input packet queue of FIG. 7 in a process packet queue.

According to movement of a second session, a controller 240 may insert packets of the second session into a pending buffer 231_0. For example, the controller 240 may merge the packets of the second sessions and may insert the merged packet into the pending buffer 231_0. According to an embodiment, the controller 240 may identify that the second session is pending, based on state information (e.g., a movement state flag) of the second session of a DB 242 and may insert and merge the packet of the second session into the pending buffer 231_0 corresponding to state information (e.g., a temporary buffer location) of the second session.

Figure 9:
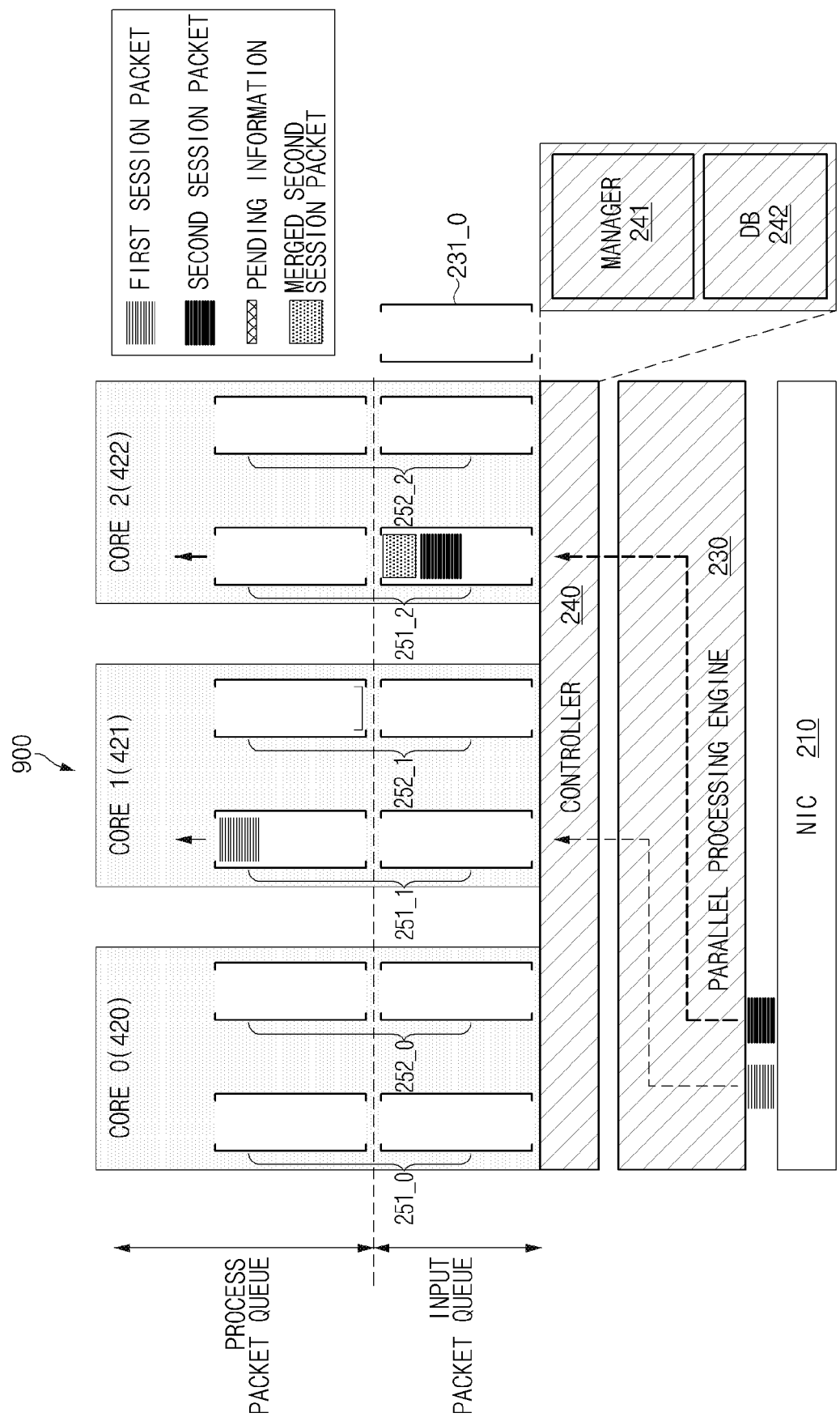
FIG. 9 illustrates packet insertion based on a packet queue according to an embodiment.

FIG. 9 illustrates packet insertion 900 based on a packet queue according to an embodiment.

According to an embodiment, a controller 240 may insert a second session packet merged and a packet of a second session received, after processing of the second session packet is completed, into an input packet queue of packet queue 2 251_2 of core 2 422. For example, the controller 240 may identify that the processing of the second session packet in core 1 421 is completed, based on a pending packet and processing packet information of core 1 421, stored in a DB 242. For another example, the controller 240 may identify packet processing completion by receiving a packet processing completion signal from core 1 421. For another example, when the packet processing completion signal is transmitted from core 1 421 to core 2 422, the manager 241 may identify the packet processing completion.

In conjunction with FIGS. 6 to 9, the various embodiments for the packet queue movement method of the partial session (e.g., the second session) were described. Hereinafter, various embodiments for a method for moving all sessions of a packet queue may be described with reference to FIG. 10.

Figure 10:
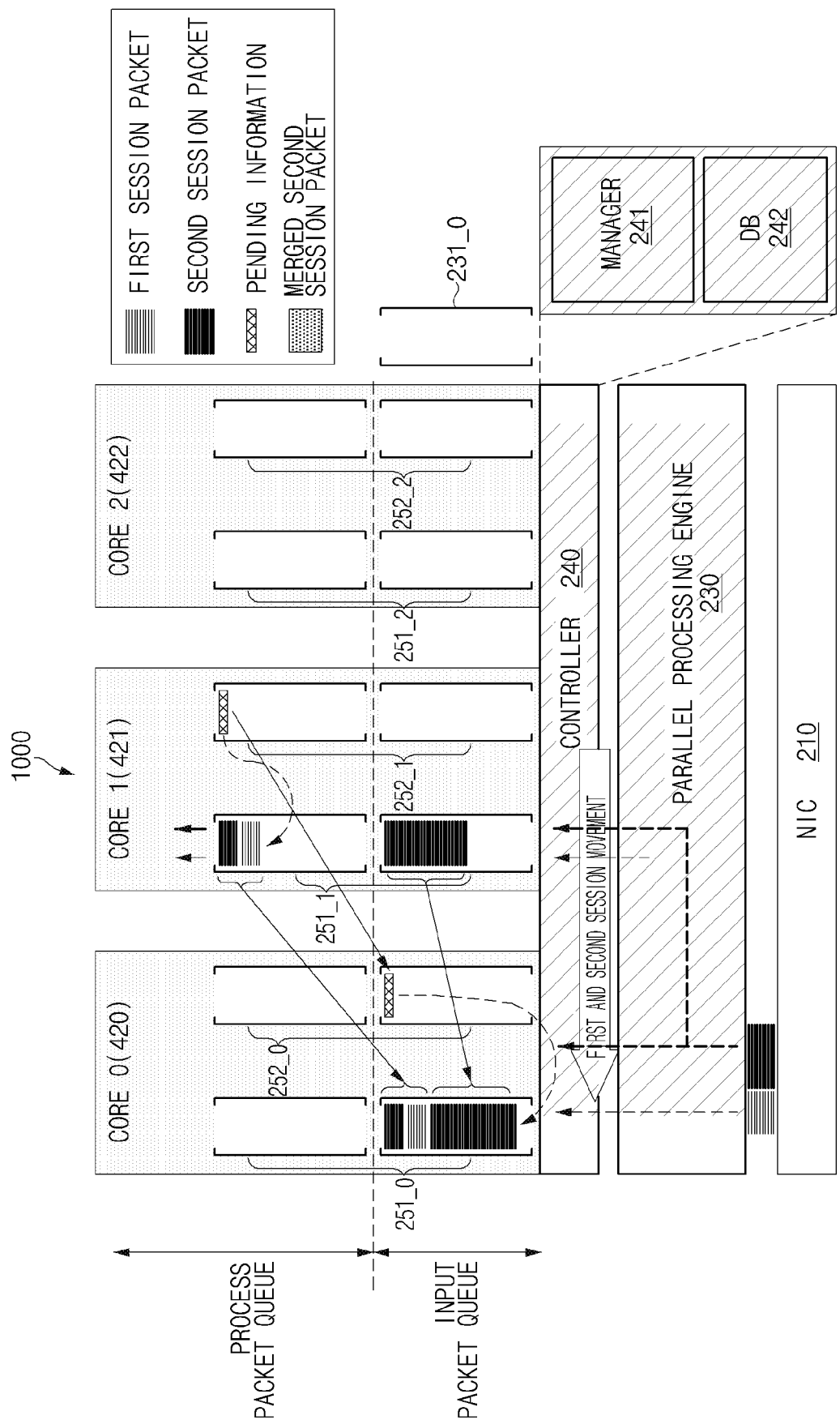
FIG. 10 illustrates simultaneous movement of multiple sessions according to an embodiment.

FIG. 10 illustrates simultaneous movement 1000 of multiple sessions according to an embodiment.

According to various embodiments, a parallel processing engine 230 may allocate a plurality of sessions associated with a packet queue to another packet queue. For example, the parallel processing engine 230 may detect turn-off of core 1 421 and may determine to move all packets of a packet queue 251_1 to core 0 420 in response to it.

For example, a controller 240 may move packets of a process packet queue of packet queue 1 251_1 to an input packet queue of packet queue 0 251_0 and may then move packets of an input packet queue of packet queue 1 251_1 to the input packet queue of packet queue 0 251_0.

According to an embodiment, the controller 240 may insert pending information of core 1 421 into pending information queue 0 252_0 of core 0 420. For example, session movement threshold information of pending information of pending information queue 1 252_1 before movement may correspond to the number of the packets of the process packet queue of packet queue 1 251_1 before the movement. The controller 240 may update pending information upon movement of the pending information. For example, session movement threshold information of pending information of pending information queue 0 252_0 after movement may correspond to the number of all packets of the input packet queue of packet queue 0 251_0 after the movement.

Figure 11:
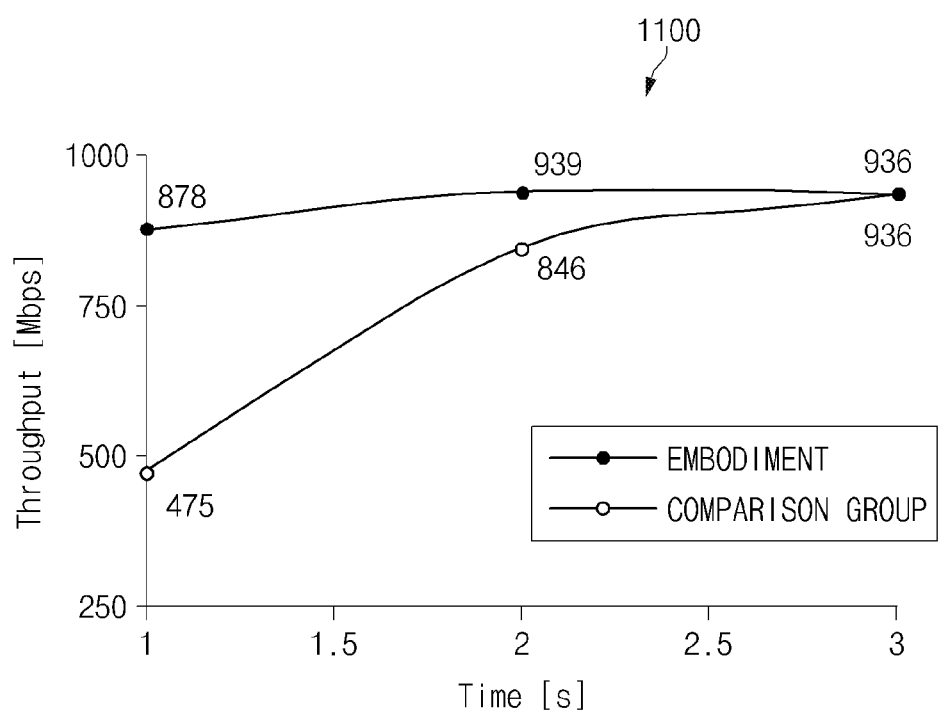
FIG. 11 a graph illustrating a throughput according to an embodiment.

FIG. 11 a graph 1100 illustrating a throughput according to an embodiment.

In FIG. 11, a change in throughput is shown after a session is changed. For example, an embodiment may correspond to a packet processing method according to the embodiment of FIG. 5. For example, a comparison group may correspond to a packet processing method according to the example of reference numeral 498 of FIG. 4.

As shown in FIG. 11, according to an embodiment of the disclosure, a throughput recovery speed after a packet queue of a session is changed may be increased. In the graph 1100 of FIG. 11, the horizontal axis may indicate time (e.g., second) after the packet queue of the session is changed, and the vertical axis may indicate the throughput (e.g., Mbps). Numbers written on each graph may indicate throughputs. Furthermore, because re-transmission due to a processing error of the packet is able to be more reduced than the comparison group, a packet processing method according to an embodiment of the disclosure may reduce a width where a data throughput is reduced, after the change.

Figure 12:
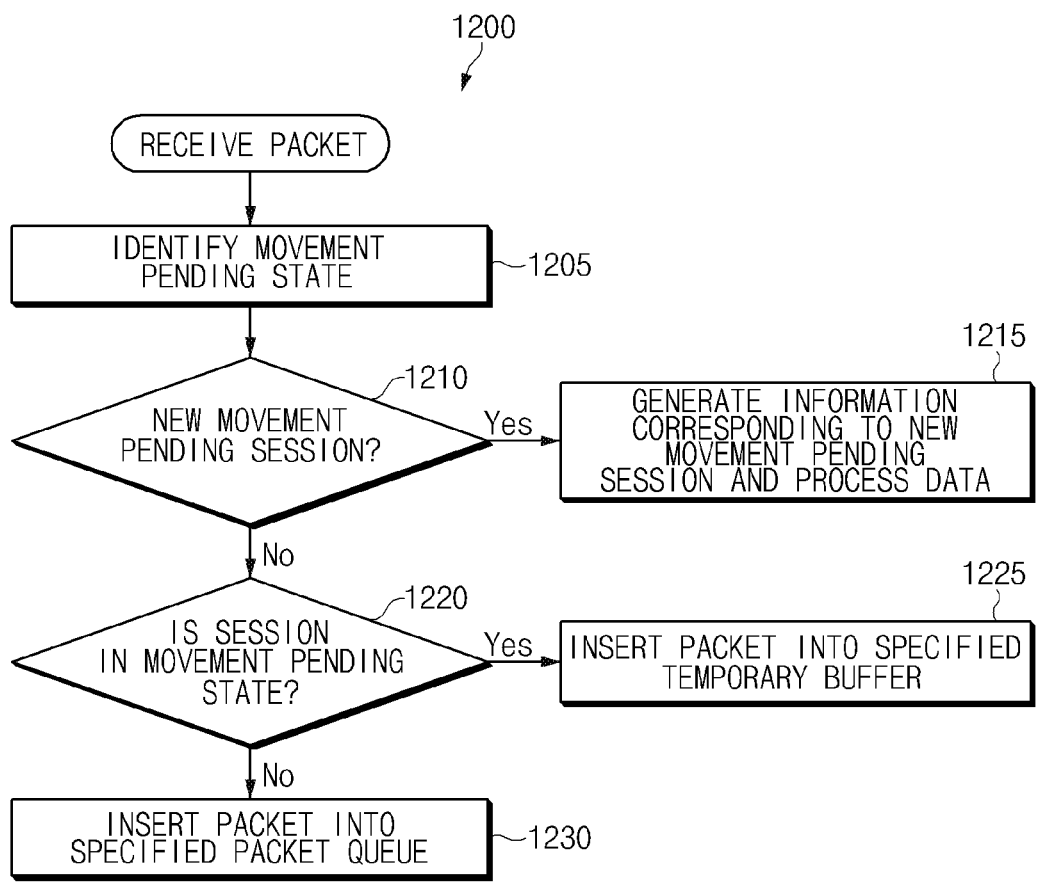
FIG. 12 a flowchart illustrating a method for inserting a packet queue according to an embodiment.

FIG. 12 a flowchart 1200 illustrating a method for inserting a packet queue according to an embodiment.

Figure 13:
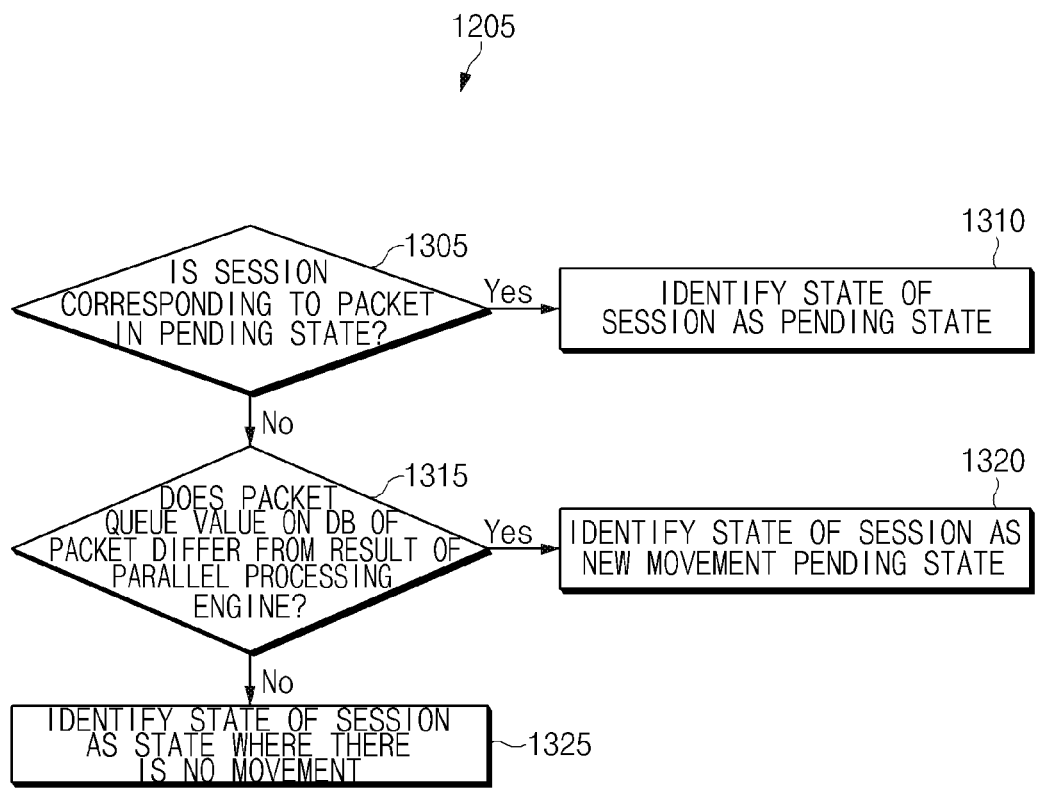
FIG. 13 a flowchart illustrating a method for determining a state of a session according to an embodiment.

FIG. 13 a flowchart illustrating a method for determining a state of a session according to an embodiment.

According to various embodiments, an electronic device (e.g., an electronic device 101 of FIG. 1) may include a processor (e.g., an AP (e.g., a processor 120 of FIG. 1) and/or a CP (e.g., a communication module 190 of FIG. 1)). The processor may perform operations described below depending on one or more instructions stored in a memory (e.g., a memory 130 of FIG. 1) (e.g., a memory electrically connected with the processor, which is an external memory of the processor or an internal memory of the processor). For example, the operations described below may be performed according to receiving a packet.

Referring to FIG. 12, according to an embodiment, in operation 1205, the processor may identify a movement pending state of a session associated with the received packet. For example, the processor may identify the movement pending state of the session based on state information of the session, stored in a DB (e.g., a DB 242 of FIG. 2) stored in the memory (e.g., the memory 130 of FIG. 1).

The method for identifying the movement pending state of the session corresponding to the packet may be described with reference to FIG. 13.

According to an embodiment, in operation 1305, the processor may determine whether the session corresponding to the packet is in a pending state. For example, the processor may identify a state of the session using information of the session, stored in the DB (e.g., the DB 242 of FIG. 2). For example, when a flag of the session information of the DB 242 is a first value, the processor may identify that the session corresponding to the packet is not in the pending state and may perform operation 1315. For another example, when the flag of the session information of the DB 242 is a second value, in operation 1310, the processor may identify that the session corresponding to the packet is in the pending state.

According to an embodiment, in operation 1315, the processor may determine whether a packet queue value on the DB 242 of the packet differs from a result of a parallel processing engine 230. For example, when identification information of a packet queue of the session, stored in the DB 242, is the same as identification information of a packet queue of the session, determined by the parallel processing engine 230, in operation 1325, the processor may identify the state of the session of the packet as a state where there is no movement. For another example, when the identification information of the packet queue of the session, stored in the DB 242, is the same as the identification information of the packet queue of the session, determined by the parallel processing engine 230, in operation 1320, the processor may identify the state of the session of the packet as a new movement pending state.

Referring again to FIG. 12, according to an embodiment, in operation 1210, the processor may determine whether the session is a new movement pending session. When the session is the new movement pending session, in operation 1215, the processor may generate information (e.g., pending information) corresponding to the new movement pending session and may process data corresponding to the new movement pending session. For example, the processor may allocate a pending buffer to the session and may insert the received packet into the pending buffer. The processor may update information of the session. The processor may insert pending information into a pending information queue corresponding to a packet queue before movement of the new movement pending session.

According to an embodiment, when a session is not the new movement pending session, in operation 1220, the processor may determine whether the session is in a movement pending state. When the session is in the movement pending state, in operation 1225, the processor may insert the packet into a specified temporary buffer. When the session is not in the movement pending state, in operation 1230, the processor may insert the packet into a specified packet queue.

Figure 14:
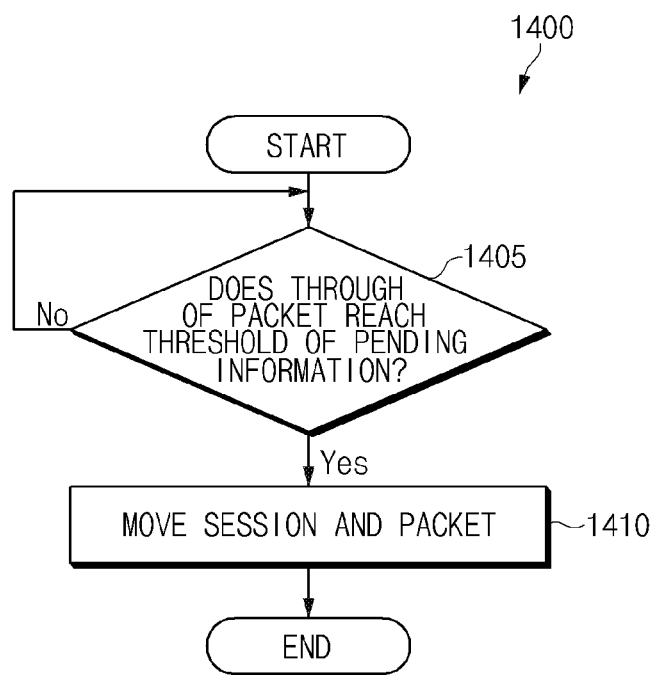
FIG. 14 a flowchart illustrating a method for moving a session and a packet according to an embodiment.

FIG. 14 a flowchart 1400 illustrating a method for moving a session and a packet according to an embodiment.

In FIG. 14, it may be assumed that a session of core 1 (e.g., core 1 421 of FIG. 4) moves to core 2 (e.g., core 2 422 of FIG. 4). For example, operations of FIG. 14 may be operations performed while a packet is processed by core 1 421. According to an embodiment, in operation 1405, core 1 421 may determine whether a throughput of the packet reaches a threshold of pending information of a pending information queue of core 1. When packet throughput of the core 1 421 does not reach the threshold, core 1 421 may continue processing a packet.

When the throughput of the packet reaches the threshold, in operation 1410, core 1 421 may perform operations for moving a session and a packet. According to an embodiment, core 1 421 may delete pending information and may insert pending session packets inserted into a pending buffer into a packet queue of core 2 422. Core 1 421 may complete packet and session movement by updating the result of moving the session and packets in a DB 242. For example, core 1 421 may transmit a signal indicating that the packet processing is completed to core 2 422 to which the packet will move.

According to an embodiment, at least some of the operations of FIG. 14 may be performed by a core (e.g., core 0 420) different from core 1 421. For example, operation 1410 may be performed by core 0 420. In this case, core 0 420 may insert the pending session packets inserted into the pending buffer into a packet queue of core 2 422. Core 0 420 may complete packet and session movement by updating the result of moving the session and packets in the DB 242. For example, core 0 420 may transmit a signal indicating that the packet processing is completed to core 2 422 to which the packet will move. For example, according to an embodiment, core 0 420 may also perform operation 1405.

Figure 15:
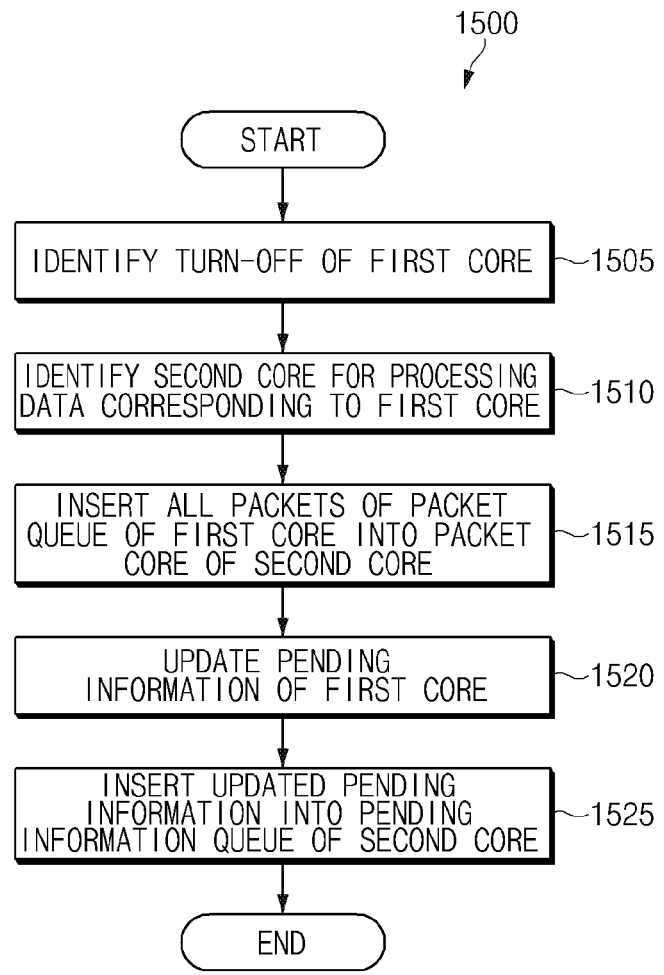
FIG. 15 a flowchart illustrating a method for moving a session depending on core-off according to an embodiment.

FIG. 15 a flowchart 1500 illustrating a method for moving a session depending on core-off according to an embodiment.

According to various embodiments, an electronic device (e.g., an electronic device 101 of FIG. 1) may include a processor (e.g., an AP and/or a CP) including a plurality of cores. The processor may perform operations described below depending on one or more instructions stored in a memory (e.g., a memory electrically connected with the processor, which is an external memory of the processor or an internal memory of the processor). For example, the operations described below may be performed according to receiving a packet.

According to an embodiment, in operation 1505, the processor may identify turn-off of a first core among the plurality of cores of the processor. For example, the first core may be deactivated dynamically according to a hotplug function.

According to an embodiment, in operation 1510, the processor may identify a second core for processing data corresponding to the first core. For example, the processor may identify the second core based on any one of a round-robin, random, load-aware, user-defined, or pre-defined scheme.

According to an embodiment, in operation 1515, the processor may insert all packets of a packet queue of the first core into a packet queue of the second core. For example, the processor may sequentially insert packets of a process packet queue and packets of an input packet queue, in the packet queue of the first core, into the packet queue of the second core.

According to an embodiment, in operation 1520, the processor may update pending information of the first core. For example, the processor may update the pending information of the first core based on the number of all the packets inserted into the packet queue of the second core in operation 1515.

According to an embodiment, in operation 1525, the processor may insert the updated pending information into a pending information queue of the second core. The second core may process packets based on the packets inserted into the packet queue and the pending information.

Figure 16:
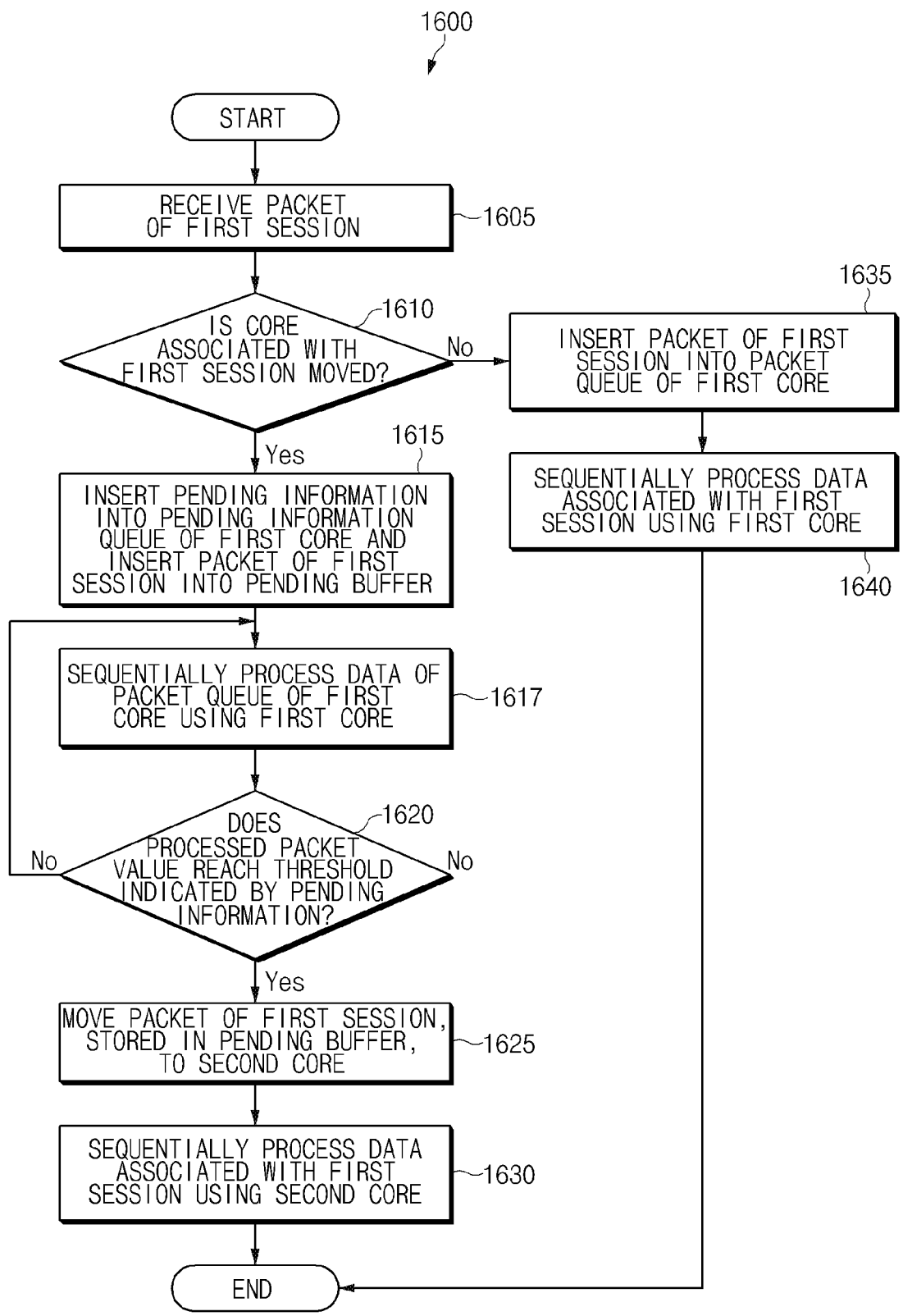
FIG. 16 a flowchart illustrating a data processing method according to an embodiment.

FIG. 16 a flowchart 1600 illustrating a data processing method according to an embodiment.

According to various embodiments, an electronic device (e.g., an electronic device 101 of FIG. 1) may include a processor (e.g., an AP (e.g., a processor 120 of FIG. 1) and/or a CP (e.g., a communication module 190 of FIG. 1)) including a plurality of cores. The processor may perform operations described below depending on one or more instructions stored in a memory (e.g., a memory 130 of FIG. 1) (e.g., a memory electrically connected with the processor, which is an external memory of the processor or an internal memory of the processor). For example, the operations described below may be performed according to receiving a packet.

According to an embodiment, in operation 1605, the processor may receive a packet of a first session. In operation 1610, the processor may determine whether to move a core associated with the first session. According to an embodiment, the processor may determine whether to move the core, based at least in part on information of the first session, stored in a DB (e.g., a DB 242 of FIG. 2) stored in the memory (e.g., the memory 130 of FIG. 1). For example, when information of a packet queue of the first session, determined by a parallel processing engine (e.g., a parallel processing engine 230 of FIG. 2), differs from packet queue information of the DB 242, the processor may determine that the core is moved. For another example, when the parallel processing engine 230 determines to move the packet queue of the first session, the processor may determine that the core is moved.

When the core is not moved, in operation 1635, the processor may insert a packet of the first session into a packet queue of a first core. In operation 1640, the processor may sequentially process data associated with the first session using the first core.

When the core is moved, in operation 1615, the processor may insert pending information into a pending information queue of the first core. Furthermore, the processor may insert a received packet of the first session into a pending buffer. For example, the processor may merge packets in the pending buffer.

According to an embodiment, in operation 1617, the processor may sequentially process data of the packet queue of the first core using the first core.

In operation 1620, the processor may determine whether a value of the processed packets reaches a threshold indicated by pending information. For example, the processor may determine whether an amount of packets processed by the first core from when the pending information is generated (e.g., when the core is determined to be move) reaches a value indicated by the threshold of the pending information. When the value of processed packets does not reach the threshold, the processor may continue sequentially processing data of the packet queue using the first core.

When the value of processed packets reaches the threshold, in operation 1625, the processor may move a packet of the first session, stored in a pending buffer, to a second core. In operation 1630, the processor may sequentially process data associated with the first session using the second core.

According to various embodiments, an electronic device (e.g., an electronic device of FIG. 1) may include a wireless communication circuitry (e.g., a communication module 190 of FIG. 1), a processor (e.g., an application processor (e.g., a processor 120 of FIG. 1) and/or a communication processor (e.g., the communication module 190 of FIG. 1)) including a plurality of cores, and a memory (e.g., a memory 130 of FIG. 1). The processor may perform an operation described below depending on one or more instructions stored in the memory (e.g., the memory 130 of FIG. 1) (e.g., a memory electrically connected with the processor, which is an external memory of the processor or an internal memory of the processor).

According to an embodiment, the processor may receive a packet of a first session associated with a first core among the plurality of cores using the wireless communication circuitry, may identify whether a core associated with the first session is changed to a second core different from the first core among the plurality of cores, may set pending information based on an amount of packets which are pending in a first packet of the first core when it is identified that the core associated with the first session is changed to the second core, may store data corresponding to the received packet of the first session in a pending buffer of the memory, and may insert the data corresponding to the received packet of the first session, the received packet being stored in the pending buffer, into a packet queue of the second core when the processing of the packets which are pending in the first packet queue is completed by the first core. For example, the processor may be an application processor or a communication processor. For example, the first session may be set up based on at least one of a transmitter address, a receiver address, a transmitter port, or a receiver port of a packet associated with the first session.

According to an embodiment, the processor may store packets of the first session, the packets being received after it is identified that the core associated with the first session is changed to the second core, in the pending buffer and may merge a plurality of packets stored in the pending buffer.

According to an embodiment, the processor may merge the plurality of packets stored in the pending buffer, based on large receive offload (LRO) or generic receive offload (GRO).

According to an embodiment, the processor may update information of the first session, the information being stored in the memory, when it is identified that the core associated with the first session is changed to the second core. For example, the information of the first session may include at least one of information of a packet queue allocated to the first session, threshold information of a packet associated with movement of the first session, a pending state flag of a session, or information of a pending buffer allocated to the session.

According to an embodiment, the processor may change the core associated with the first session to the second core based on deactivation of the first core.

According to an embodiment, the processor may sequentially process the data associated with the first session, the data being inserted into the packet queue of the second core, using the second core. For example, the processor may compare an amount of packets indicated by the pending information with an amount of packets processed by the first core to determine whether the processing of the packets which are pending in the first packet queue is completed. The processor may deliver a signal indicating that the processing of the first packet queue is completed to the second core, when the processing of the packets which are pending in the first packet queue is completed.

According to an embodiment, a method for processing data in an electronic device (e.g., an electronic device 101 of FIG. 1) including a processor (e.g., a processor 120 and/or a communication module 190 of FIG. 1) including a plurality of cores may include receiving a packet of a first session associated with a first core among the plurality of cores, identifying whether a core associated with the first session is changed to a second core different from the first core among the plurality of cores, setting pending information based on an amount of packets which are pending in a first packet of the first core when it is identified that the core associated with the first session is changed to the second core, storing data corresponding to the received packet of the first session in a pending buffer of a memory of the electronic device, and inserting the data corresponding to the received packet of the first session, the received packet being stored in the pending buffer, into a packet queue of the second core, when the processing of the packets which are pending in the first packet queue is completed by the first core.

According to an embodiment, the method may further include storing packets of the first session, the packets being received after it is identified that the core associated with the first session is changed to the second core, in the pending buffer and merging a plurality of packets stored in the pending buffer.

According to an embodiment, the merging of the plurality of packets may include merging the plurality of packets stored in the pending buffer, based on large receive offload (LRO) or generic receive offload (GRO).

According to an embodiment, the method may further include updating information of the first session, the information being stored in the memory of the electronic device, when it is determined that the core associated with the first session is changed to the second core. For example, the information of the first session may include at least one of information of a packet queue allocated to the first session, threshold information of a packet associated with movement of the first session, a pending state flag of a session, or information of a pending buffer allocated to the session.

According to an embodiment, the method may further include changing the core associated with the first session to the second core based on deactivation of the first core.

According to an embodiment, the method may further include sequentially processing the data associated with the first session, the data being inserted into the packet queue of the second core, using the second core.

According to an embodiment, the method may further include comparing an amount of packets indicated by the pending information with an amount of packets processed by the first core to determine whether the processing of the packets which are pending in the first packet queue is completed.

According to an embodiment, the method may further include delivering a signal indicating that the processing of the first packet queue is completed to the second core, when the processing of the packets which are pending in the first packet queue is completed.

According to an embodiment, the sequential processing of the data associated with the first session, the data being inserted into the packet queue of the second core, using the second core may include sequentially processing the data associated with the first session, the data being inserted into the packet queue of the second core, using the second core, when the signal is received.

According to an embodiment, the first session may be set up based on at least one of a transmitter address, a receiver address, a transmitter port, or a receiver port of a packet associated with the first session.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in the disclosure, the electronic device may maintain an order where packets are processed, through buffering.

According to various embodiments disclosed in the disclosure, the electronic device may enhance a processing speed of a session and a throughput upon session movement, through receive offload of the buffered packets.

In addition, various effects directly or indirectly ascertained through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
   a wireless communication circuitry; a processor operatively connected with the wireless communication circuitry and including a plurality of cores; and
   a memory operatively connected with the processor and mounted inside or outside the processor, wherein the processor to configured to:
   receive packets of a first session associated with a first core among the plurality of cores using the wireless communication circuitry; identify whether a core associated with the first session is changed to a second core different from the first core among the plurality of cores;
   in response to identifying that the core associated with the first session is changed to the second core, set pending information based on an amount of packets that are pending in a first packet queue of the first core;
   store a plurality of packets of the first session being received after identifying the core associated with the first session is changed to the second core, in a pending buffer of the memory;
   merge, using the second core, the plurality of packets stored in the pending buffer while remaining packets that remain in the first packet queue are processed by the first core;
   insert the merged plurality of packets from the pending buffer into a second packet queue of the second core, when processing of remaining packets is completed by the first core.

2. The electronic device of claim 1, wherein the processor is further configured to:' merge the plurality of packets stored in the pending buffer based on large receive offload (LRO) or generic receive offload (GRO).

3. The electronic device of claim 1, wherein the processor is further configured to: change the core associated with the first session to the second core based on deactivation of the first core.

4. The electronic device of claim 1, wherein the processor is further configured to: sequentially process data associated with the first session along with the merged plurality of packets using the second core.

5. The electronic device of claim 4, wherein the processor is further configured to: compare a first amount of packets indicated by the pending information with a second amount of packets processed by the first core to determine whether the processing of the remaining packets that are pending in the first packet queue is completed.

6. The electronic device of claim 5, wherein the processor is further configured to: deliver a signal indicating that the processing of the remaining packets in the first packet queue is completed to the second core, when the processing of the remaining packets is completed.

7. The electronic device of claim 1, wherein the processor is an application processor or a communication processor.

8. The electronic device of claim 1, wherein the first session is set up based on at least one of a transmitter address, a receiver address, a transmitter port, or a receiver port of a packet associated with the first session.

9. A method for processing data in an electronic device including a processor including a plurality of cores, the method comprising:
   receiving packets of a first session associated with a first core among the plurality of cores; identifying whether a core associated with the first session is changed to a second core different from the first core among the plurality of cores;
   in response to identifying that the core associated with the first session is changed to the second core, setting pending information based on an amount of packets that are pending in a first packet queue of the first core;
   storing a plurality of packets of the first session being received after identifying the core associated with the first session is changed to the second core, in a pending buffer of a memory;'
   merging, using the second core, the plurality of packets stored in the pending buffer while remaining packets that remain in the first packet queue are processed by the first core; and
   inserting the merged plurality of packets from the pending buffer into a second packet queue of the second core, when processing of remaining packets is completed by the first core.

10. The method of claim 9, wherein merging the plurality of packets includes: | merging the plurality of packets stored in the pending buffer, based on large receive offload (LRO) or generic receive offload (GRO).

11. The method of claim 9, further comprising: updating information of the first session, the information being stored in the memory of the electronic device, when the core associated with the first session is changed to the second core, wherein the information of the first session includes at least one of information of a packet queue allocated to the first session, threshold information of a packet associated with movement of the first session, a pending state flag of a session, or information of a pending buffer allocated to the session.

12. The method of claim 9, further comprising: changing the core associated with the first session to the second core based on deactivation of the first core.

13. The method of claim 9, further comprising: sequentially processing data associated with the first session along with the merged plurality of packets using the second core.

14. The method of claim 13, further comprising: comparing a first amount of packets indicated by the pending information with a second amount of packets processed by the first core to determine whether the processing of the remaining packets that are pending in the first packet queue is completed.

15. The method of claim 14, further comprising:
delivering a signal indicating that the processing of the remaining packets in the first packet queue is completed to the second core, when the processing of the remaining packets is completed.

16. The method of claim 15, wherein sequentially processing the data associated with the first session, the data being inserted into the second packet queue of the second core, using the second core includes:
sequentially processing the data associated with the first session, the data being inserted into the second packet queue of the second core, using the second core, when the signal is received.

17. The method of claim 9, wherein the first session is set up based on at least one of a transmitter address, a receiver address, a transmitter port, or a receiver port of a packet associated with the first session.

18. The electronic device of claim 1, wherein the processor is further configured to: update information of the first session, the information being stored in the memory, when the core associated with the first session is changed to the second core, and wherein the information of the first session includes at least one of information of a packet queue allocated to the first session, threshold information of a packet associated with movement of the first session, a pending state flag of the first session, or information of a pending buffer allocated to the first session.

* * * * *